March 12, 1940.   J. METTLER   2,193,108
METER
Filed Jan. 27, 1936   3 Sheets-Sheet 1
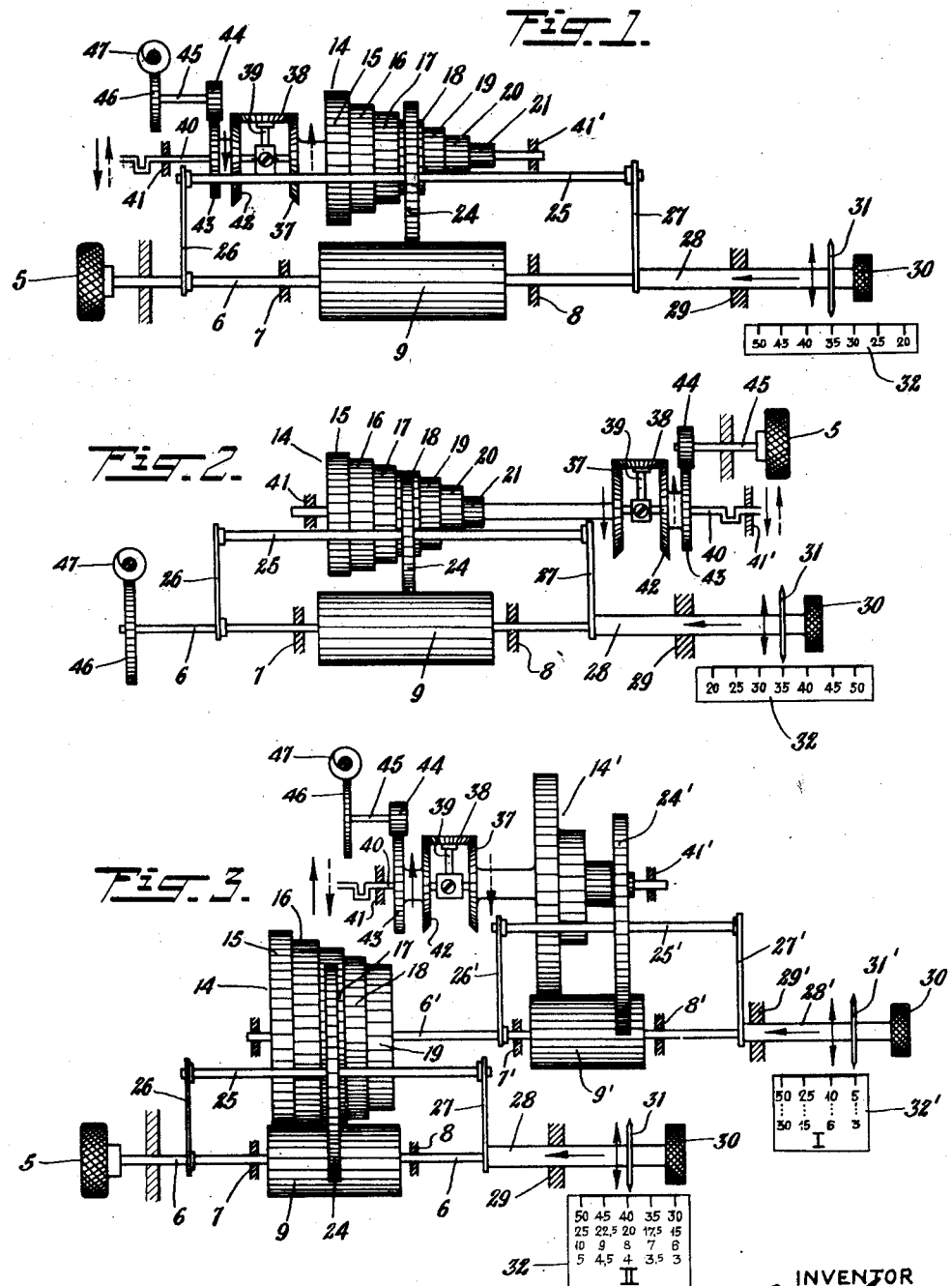

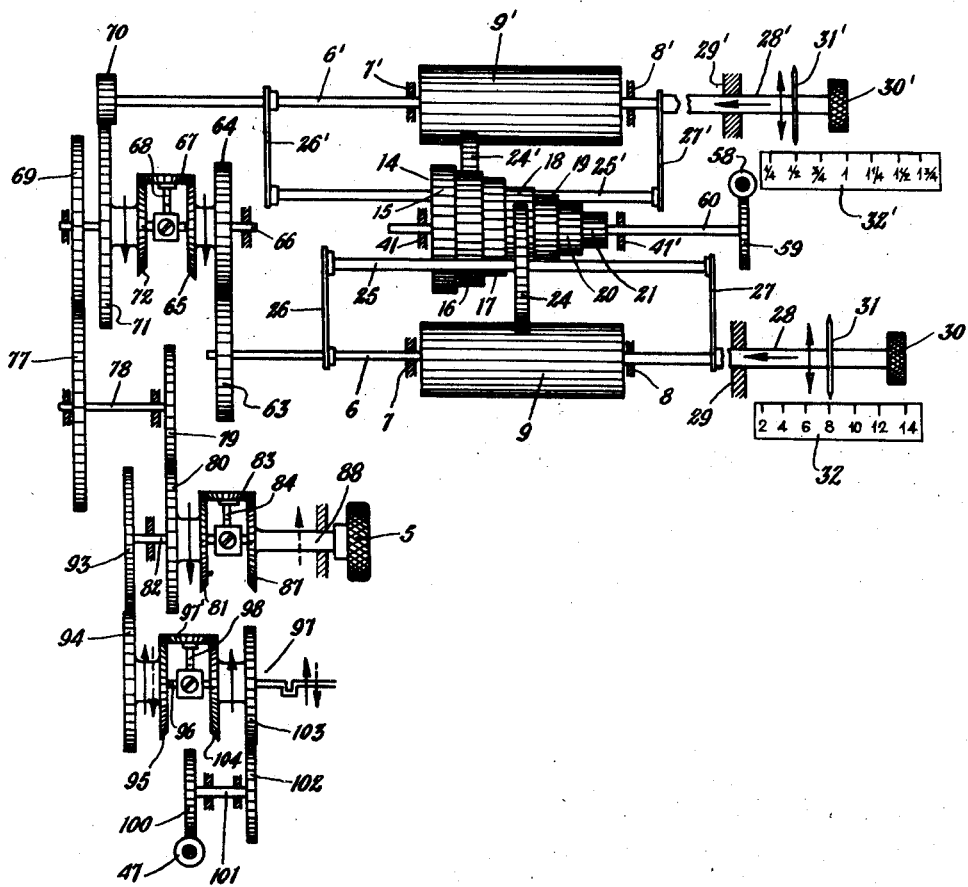

March 12, 1940.   J. METTLER   2,193,108
METER
Filed Jan. 27, 1936   3 Sheets-Sheet 3
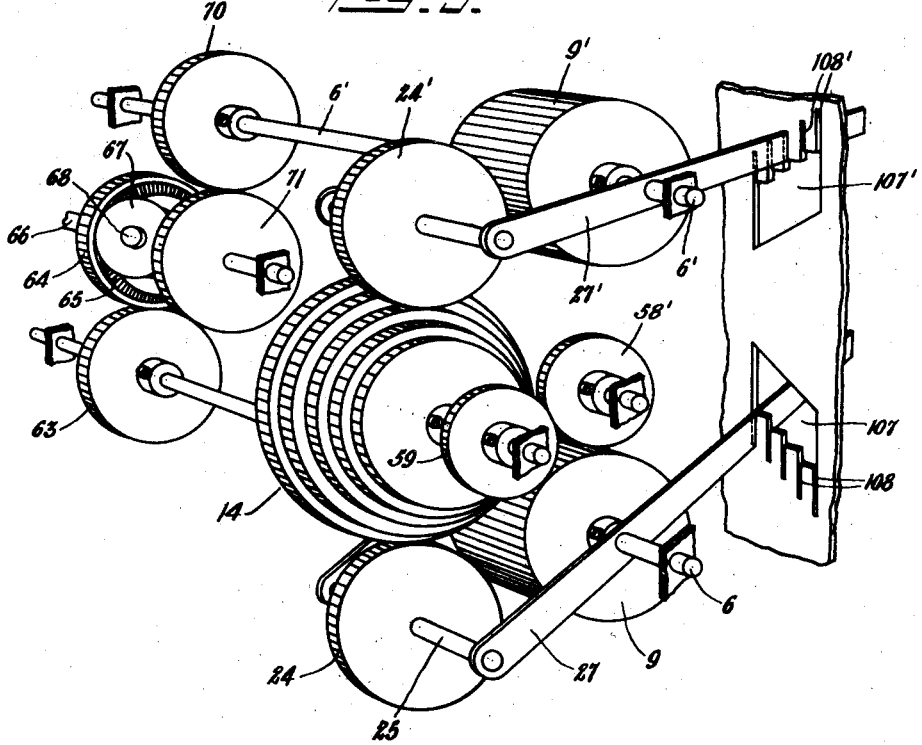
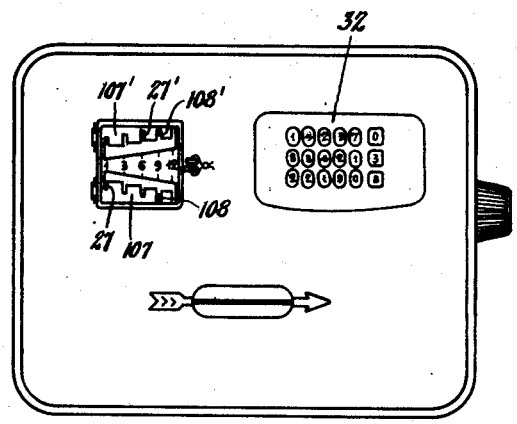
INVENTOR
Josef Mettler
BY Morgan Finnegan Durham
ATTORNEYS Patented Mar. 12, 1940

2,193,108

UNITED STATES PATENT OFFICE 2,193,108

METER

Josef Mettler, Allenwinden, Zug, Switzerland, assignor to Landis & Gyr, A.-G., a corporation of Switzerland Application January 27, 1936, Serial No. 60,908
In Switzerland February 19, 1935

3 Claims. (Cl. 194—3)

The invention relates to new and useful improvements in meters and more particularly in the preferred exemplary embodiment to rate changing controlling means applied to prepayment electricity meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a diagrammatic showing of a mechanism embodying the invention wherein the settable multiple speed gearing is arranged between the coin mechanism and the time switch or other quantity mechanism;

Fig. 2 is a similar view wherein said gearing is arranged between the meter and the time switch or other quantity mechanism;

Fig. 3 is a view similar to Figure 1 showing the mechanism with two sets of settable multiple speed gearing;

Fig. 4 is a similar showing of a mechanism including a compound settable multiple speed gearing cooperating with a time-measuring or other basic charge device;

Fig. 5 is a perspective view of a portion of the gearing shown in Figure 4;

Fig. 6 is an elevation of a coin-controlled meter.

Objects of the invention are to provide a simple, sturdy and efficient metering mechanism capacitated to operate on either a variable quantity charge basis, or a variable basic or time charge basis, or concurrently on both bases, and to change the rate or charge for either or both in a quick and direct manner by a simple manipulation of the mechanism; to provide for effecting a desired change in either the quantity rate mechanism or the base rate mechanism without disturbing the other, where both are run in the same meter; to provide for freely and independently changing either or both rates by simple manipulation of a settable device without structural disturbance or disruption of the mechanism, and especially to effect these functions without removal and replacement of meter parts; to provide a simple, indexed settable device for setting and changing the quantity and time rates or either of them; to provide instrumentalities capacitated as described which are operable from without a sealed or locked meter casing and are adapted themselves to be locked or sealed against unauthorized manipulation; to provide in a prepayment meter a change gear mechanism wherein an alteration of the unit price, such as the energy charge, the basic charge, or both, can be effected in a plurality of stages, such mechanism being preferably adapted to be interposed between the coin mechanism and the quantity mechanism, or between the meter and the quantity mechanism, or, if desired, between the basic charge device and the quantity mechanism.

For the attainment of the foregoingly stated, and other objects as well, the exemplary embodiment shows the invention applied to a prepayment meter which makes both a consumption or quantity charge and also a time or other basic charge, the rate for either of these being independently changeable without disturbing the structure or even the operation of the meter, by changing the gear ratio in the drive from a meter disc spindle, or from a synchronous motor, or from both, or from any other suitable energy or time measuring device and by such change to effect and control the power circuit which supplies the current purchased. The control mechanism for the power circuit is usually a switch mechanism closed by the actuation of the coin controlled mechanism and opened by the meter after a predetermined energy consumption, the lapse of a predetermined time period, or a combination of these. The changes in the speed ratio of the driving and driven gears is effected by providing an idler between a driving and a driven gear, one of said gears being a multiple ratio gear, the idler being disengageable from one step of the multiple gear and engageable with another step thereof by merely manipulating a handle with which cooperates an index showing the various rates. The handle or like manipulating mechanism is outside the meter casing and may itself be locked or sealed. The meter may be set and reset simply and easily whenever desired and without even opening the casing and the index or scale always shows by mere inspection the quantity rate charge or the time rate charge, or both, on which the meter may be operating at any time.

It will be understood that the foregoing general description and the following detailed description as well are illustrative and exemplary but are not restrictive of the invention.

Referring now in detail to the accompanying drawings, illustrating by way of example certain embodiments of the invention, and wherein it is shown applied to a prepayment meter, in Fig. 1 of the drawings a coin-receiving mechanism, not shown and which may be of any known or suitable form, is indicated by the hand wheel 5. Upon deposit of a specified coin, and proper manipulation of the device, the hand wheel 5 may be turned a predetermined distance or amount, and thereby correspondingly sets a power circuit controlling device, such as a switch, and thereby turns on the power purchased by the deposited coin. Said controlling device is oppositely moved proportionately to the energy consumed, and the opening of the switch is effected after a predetermined energy consumption, or lapse of a predetermined time, or a combination of these. In said diagrammatic showing the hand wheel 5 is fast on a shaft 6 journaled in bearings 7 and 8, and in this embodiment the settable variable speed gearing is arranged between the coin mechanism and the power circuit controlling switch set thereby. As so embodied, a broad faced pinion 9 is fixed on the shaft 6 to rotate therewith. A compound gear 14 is loosely journaled on a shaft 40, and cooperates with the pinion 9 and is shown as consisting of seven spur gears of different diameters fixed together and indicated by reference numerals 15 to 21. An idler 24 is continuously in mesh with the broad faced pinion 9 and is selectively movable into and out of mesh with any of the seven gears of the compound gear 14, thereby providing a very wide variety of gear ratios between the driving pinion 9 and the driven gear 14.

The embodied form of mechanism for shifting the idler 24 from one driving position to another comprises a shaft 25 on which the gear 24 rotates freely, but is held against longitudinal movement on the shaft. Shaft 25 is supported on two arms 26 and 27, the arm 26 being slidable along the shaft 6, and the arm 27 being fixed on the end of a hollow sleeve 28, which sleeve is mounted to slide and rotate in a bearing 29, and the inner end of the shaft 6 is journaled within the sleeve 28, and the sleeve being slidable on shaft 6. A hand wheel 30 is fixed on sleeve 28, which is both rotatable and slidable in its bearing 29 as indicated by the arrows in Fig. 1. An indicating disc 31 is mounted on sleeve 28 and cooperates with a scale 32, which is usually calibrated for coin values. The meter casing may have the bearing conveniently formed in one wall of the casing. The casing 29 encloses the entire mechanism in a well known manner, the gear shift 30 and the index being on the outside of the casing. These may be sealed or locked as desired. Means are provided whereby the mechanism just described is utilized to give a variable setting to a circuit-controlling device from a given amount of rotation of the hand wheel 5 permitted by the deposit of a coin. As embodied, a sun wheel 37 of a planetary gear is fixed to the compound gear 14 to rotate therewith. The planet wheel 38 of the planetary gear is journaled on shaft 39, which is fixed to the shaft 40, which is journaled in bearings 41 and 41', the compound gear 14 and planetary gear 37 being journaled loosely on shaft 40. Shaft 40 at its other end is connected to the power circuit-controlling device (not shown) the setting and operation of which is controlled by the rotation of shaft 40.

The rotation of shaft 40 in one direction closes and sets the switch, and the rotation of the shaft in the opposite direction opens the switch at the proper time. The other sun wheel 42 of the planetary gear is mounted loosely on shaft 40 and integral with the sun wheel is a spur gear 43. Meshing with spur gear 43 is a pinion 44 fixed on a shaft 45, and fixed also on said shaft is a gear 46 meshing with a gear 47 on the meter shaft.

In the operation of the aforesaid mechanism the hand wheel 5 is rotated a predetermined angular distance on the deposit of a coin, and the compound gear 14 is thereby rotated, the relative amount of rotation, that is, the speed ratio being determined by the particular gear of compound gear 14 with which the idler 24 is in mesh. The shifting and positioning of the idler is effected by the hand wheel 30, and is indicated by the pointer disc 31 and scale 32, which indicates the unit charge for the power. When hand wheel 5 is turned after deposit of a coin, the compound gear 14 is turned thereby, sun wheel 37 rotates planet wheel 38, which rolls on sun wheel 42 and thereby rotates shaft 40, which shaft sets the power circuit-controlling device, and the setting will correspond to the setting of idler gear 24. When the meter is running, it drives sun wheel 42 which causes planet wheel 38 to roll on sun wheel 37 and rotates shaft 40 in the opposite direction from its rotation by the hand wheel 5 of the coin mechanism. The direction of rotation of the shaft by the coin mechanism is indicated by the dotted arrows and the direction of rotation of the shaft by the meter is shown by the solid arrows. By selectively setting the ratio of the gearing, the number of kilowatt hours per unit coin is determined, and is in accordance with the indications of the index. The mechanism, of course, is enclosed and sealed, and the setting and indicating mechanism on the outside of the meter casing may likewise be sealed against tampering. The number of teeth on the various wheels of the compound gear may be made such that in the calculation of the reciprocal value of the power charge no irrational value results. The calibration of the scale 32 can therefore be effected directly in monetary values for the kilowatt hour unit.

In Fig. 2 of the drawings a similar mechanism is diagrammatically shown, the main difference being that the variable ratio gear drive is arranged between the meter 47 and the quantity measuring shaft 40. The corresponding parts are indicated by the same reference numerals, and the parts need not be described again. In this mechanism the hand wheel 5 of the coin mechanism is connected to a shaft 45 to which is fixed a pinion 44, which meshes with a gear wheel 43 fast to the sun wheel 42 of the planetary gear. The meter 47 drives on to the gear 46 which is fast on the shaft 6, the broad-faced pinion 9 being also fixed to the shaft. In this mechanism, by the deposit of a coin, a predetermined amount of rotation of the hand wheel 5 is permitted and a fixed amount of angular rotation is imparted to the shaft 40 of the power circuit-controlling device through the rotation of the sun wheel 42 and the planet wheel 38 rolling on sun wheel 37. The meter drives through the variable speed ratio gearing, and the amount of rotation of the sun wheel 37 relative to the rotation of the meter shaft 47 is determined by the setting of the disc 31. In this form, by changing the velocity ratio of the gearing, by means of the index device, and thereby shifting the idler from engagement with one of the gears of the compound gear to another, the price of the kilowatt hour is altered directly.

By altering the velocity ratio even within comparatively small limits, the energy to be employed for turning the gear wheels of the stepped gear 14 is obviously altered. The meter 47 consequently does not always have to supply the same amount of energy for the turning back of the quantity shaft 40.

In Fig. 3 of the drawings there is exemplified a mechanism of the same general arrangement as in Fig. 1, but showing a plurality of speed ratio changing gearings with a plurality of settable devices, whereby a relatively large number of rate settings may be made as compared with the number of gears employed. The corresponding parts have been indicated by the same numerals as in the preceding description, and need not be described in detail again. In this embodiment, the hand wheel 5 may be given a predetermined amount of rotation on the deposit of a coin, and the relative amount of rotation of the compound gear 14 is determined by the setting of the hand wheel 30 and the index mechanism. Thus a variable amount of angular movement is imparted to the shaft 6' from the shaft 6, and to the broad faced pinion 9' fixed to the shaft 6'. The relative movement imparted to compound gear 14' and thereby to sun wheel 37 is again relatively variable dependent on the setting of the hand wheel 30' and its index. By reason of the permutations available, a very wide range of settings is possible with this small amount of relatively simple gearing. In the particular mechanism since one compound gear has five wheels and the other four wheels, twenty speed ratios and thereby twenty different tariffs can be set.

The chief advantage of this mechanism is the capacity for selecting and setting any of a large number of prices marked on the index devices with the relatively simple gearing. While the mechanism is shown of the same general arrangement as in Fig. 1, the same mechanism or type of mechanism may be arranged in the same relation as in Fig. 2; in the one case the number of kilowatt hours per unit coin is predeterminedly set and in the other case a desired variation in the price of the kilowatt hour is effected.

In Fig. 4 of the drawings a different form is shown, wherein the speed ratio changing gear is operated by a plurality of settable index devices to change the shiftable idler gears, two of the shiftable idler gears in this instance coacting with a single compound gear 14. This mechanism as shown in Fig. 4 is arranged between a basic charge device, such as a clock or a synchronous motor, and the control device for the power circuit. Such a device could also be arranged between the meter and the control for the power circuit if desired. In the embodiment of Fig. 4 the same reference numerals are applied to the parts as in the preceding description and the description need not be repeated. In this mechanism, the compound or stepped gear 14 is driven from the spindle 58 of a synchronous motor, which drives the gear 59, said gear shaft being fast on the shaft 60 of the stepped gear 14. Meshing selectively with the various gears of the compound gear 14 are two idler gears 24 and 24' which are respectively shiftable and settable by the hand wheels 30 and 30' in the manner previously described, these idlers permanently meshing with and driving, respectively, the broad faced pinions 9 and 9'.

Both pinions 9 and 9' drive on to a common gearing so as to additively drive the power circuit-controlling device 97. As embodied, a gear 63 is fixed on the shaft 6 of pinion 9 and meshes with a gear 64, which is integral with the sun wheel 65, both being loosely mounted on shaft 66. The planet wheel 67 is journaled on shaft 68, radially connected to shaft 66. Fixed on shaft 66 also is a gear 69. Fixed on shaft 6' of broad faced pinion 9' is a gear 70, which meshes with a gear 71 which is integral with the sun wheel 72, both being loosely journaled on shaft 66 and the sun wheel meshing with the planet wheel 67. The drive from the pinions 9 and 9' on to the gear 69 is additive, as is indicated by the solid line arrows, so that the rotation of shaft 66 and gear 69 is the sum of the rotation of shaft 6 and 6'. Meshing with gear 69 is a gear 77, fast on a shaft 78, a gear 79 being also fast on said shaft. Gear 79 meshes with a gear 80, which is integral with sun wheel 81 of another planetary gear journaled loosely on a shaft 82. The intermeshing planetary wheel 83 is journaled on a shaft 84 fixed radially on shaft 82. The other sun wheel 87 is fixed on a sleeve 88, connected to turn with the hand wheel 5 of the coin-controlled mechanism.

The gear train from this point to the power circuit-controlling device 97 may be driven either from the basic charge device 58 through gear 79 or from the hand wheel 5 of the coin mechanism, but in different directions, as indicated by the solid and broken line arrows. As embodied, fixed on shaft 82 is a gear 93, which meshes with a gear 94, integral with a sun wheel 95, loosely journaled on a shaft 96. The planet wheel 97' is mounted on a shaft 98, radially connected to shaft 96, the shaft 96 being connected to the power circuit-controlling device 97. In the described mechanism the time measuring device 58 drives through the settable speed ratio changing gear, with the wide range of settings provided by reason of the two settable devices, the drive being additive or cumulative and unidirectional through the planetary gears on to the gear 80. By means of the next planetary gear and the coin-controlled mechanism, shaft 82 is rotated in one direction from the basic charge device 58 and in the opposite direction from the coin-controlled mechanism 5 to operate the power circuit control 97 responsively to the settings of the coin-controlled mechanism and also to the drive of the time mechanism 58. The direction of drive is indicated by the solid line arrows for the time mechanism 58 and by the broken line arrows for the coin-controlled mechanism.

In the exemplified mechanism, the meter 47 is shown driving directly on to the power circuit-controlling device 97, the spindle 47 meshing with a gear 100 on a shaft 101, on which shaft is also the gear 102. Gear 102 meshes with a gear 103 integral wtih the other sun wheel 104, which also meshes with the planet wheel 97. The direction of rotation of the drives from the time device 58 and from the meter 47, shown by the solid arrows, is cumulative or additive as already described.

In Fig. 5 is shown a modified form of gear shifting and setting mechanism applied exemplarily to a mechanism similar to that shown in Figure 4, and corresponding parts will be similarly numbered and will not be described again. In this figure the arms 27 and 27' are shown mounted pivotally and slidably upon the shafts 6 and 6', respectively. The levers 27 and 27' cooperate respectively with racks 107 and 107', formed in the meter casing, and having recesses 108 and 108' to receive the levers. Either lever may be rocked out of any one of the recesses thereby swinging the corresponding idler 24 or 24' out of mesh with the compound gear 14, and the lever may be slid along its shaft and then be slipped into another of the recesses 108, thereby bringing the corresponding idler 24 or 24' into mesh with another of the gears of the compound gear 14, the mechanism being then held in position because of the lever resting in the recess or detent. An elevation of one form of meter embodying the invention is shown in Fig. 6.

The invention in its broader aspects is not limited to the specific mechanisms shown and described but departures may be made therefrom within the scope of the accompanying claims without departing from the principles of the invention and without sacrificing its chief advantages.

What I claim is:

1. In a prepayment meter device the combination of a shaft to be driven proportionally to time, a shaft to be driven by a meter, a switch operating shaft and a shaft to be driven by a coin control, said meter and switch shafts being connected to a differential for opening the switch by the meter, gearing connecting the time driven shaft to a second differential, said second differential being also connected to the coin controlled shaft, the movement of which drives said differential oppositely to the movement of the time driven shaft, means interconnecting the first and second differentials for actuating the switch operating shaft by the combined action of the time, coin and meter controlled shafts, said gearing including a set of stepped gears to be driven by said time driven shaft, pinions adapted to be meshed with said stepped gears, another differential driven by said pinions and driving said switch operating shaft through the other differential gearings.

2. In a prepayment meter device, the combination of a differential gearing, a meter driven shaft, a switch operating shaft and a shaft to be driven by a coin control, means including said differential gearing to operate said switch shaft in one direction by the coin control shaft and in the opposite direction by the metering shaft, additional means including a set of stepped gears driven by one of said driven shafts, a plurality of swingable pinions adapted to be selectively meshed with any of said stepped gears and means for combining the pinion movements and transmitting their combined movement to the switch operating shaft through the differential gearing.

3. In a prepayment meter device, the combination of a differential gearing, a meter driven shaft, a switch operating shaft driven by said differential gearing and a shaft to be driven by a coin control, means including said differential gearing to operate said switch shaft in one direction by the coin control shaft and in the opposite direction by the metering shaft, said means including stepped gears driven by one of said driven shafts, a pinion adapted to be meshed with a selected one of said stepped gears, a broad faced gear driven by the other driven shaft and meshing with said pinion and along which said pinion is slidable in mesh therewith, means for changing the mesh of said pinion and stepped gears to vary the drive from the coin control shaft to the switch operating shaft through said differential.

JOSEF METTLER.